United States Patent [19]
Ribacoff

[11] Patent Number: 5,635,981
[45] Date of Patent: Jun. 3, 1997

[54] VISITOR IDENTIFICATION SYSTEM

[76] Inventor: Elie D. Ribacoff, 184-03 69th Ave., Fresh Meadows, N.Y. 11365

[21] Appl. No.: 516,720

[22] Filed: Jul. 10, 1995

[51] Int. Cl.$^6$ ...................................... H04N 7/18
[52] U.S. Cl. ...................... 348/156; 348/158; 348/159
[58] Field of Search ........................ 348/143, 150, 348/153, 154, 156, 157, 158, 159; H04N 7/18

[56] References Cited

U.S. PATENT DOCUMENTS

| | | | |
|---|---|---|---|
| 3,564,132 | 2/1971 | Baker | 348/156 |
| 3,612,764 | 10/1971 | Gilkeson | 348/156 |
| 3,997,723 | 12/1976 | Sandin | 348/156 |
| 4,001,881 | 1/1977 | Folsom | 358/159 |
| 4,449,189 | 5/1984 | Feix et al. | 395/2.82 |
| 4,511,886 | 4/1985 | Rodriguez | 348/154 |
| 4,581,634 | 4/1986 | Williams | 348/156 |
| 4,821,118 | 4/1989 | Lafreniere | 348/156 |
| 4,961,177 | 10/1990 | Uehara | 395/2.82 |
| 4,991,008 | 2/1991 | Nama | 348/150 |
| 5,012,522 | 4/1991 | Lambert | 348/143 |
| 5,210,603 | 5/1993 | Sabin | 348/157 |
| 5,259,025 | 11/1993 | Monroe et al. | 380/23 |
| 5,283,644 | 2/1994 | Maeno | 348/152 |
| 5,398,057 | 3/1995 | Tapp | 348/154 |

*Primary Examiner*—Howard W. Britton
*Attorney, Agent, or Firm*—Galgano & Burke

[57] ABSTRACT

A portable, self-contained visitor identification system comprising a first camera for recording a first image and a second camera for recording a second image from a piece of identification and a recording device connected to the first video camera and the second video camera for alternatively recording the first image and the second image. A switching mechanism switches the video recording device to record the first image from the first video camera, to subsequently record the second image from the second video camera and then to record the image of the first video camera.

28 Claims, 6 Drawing Sheets

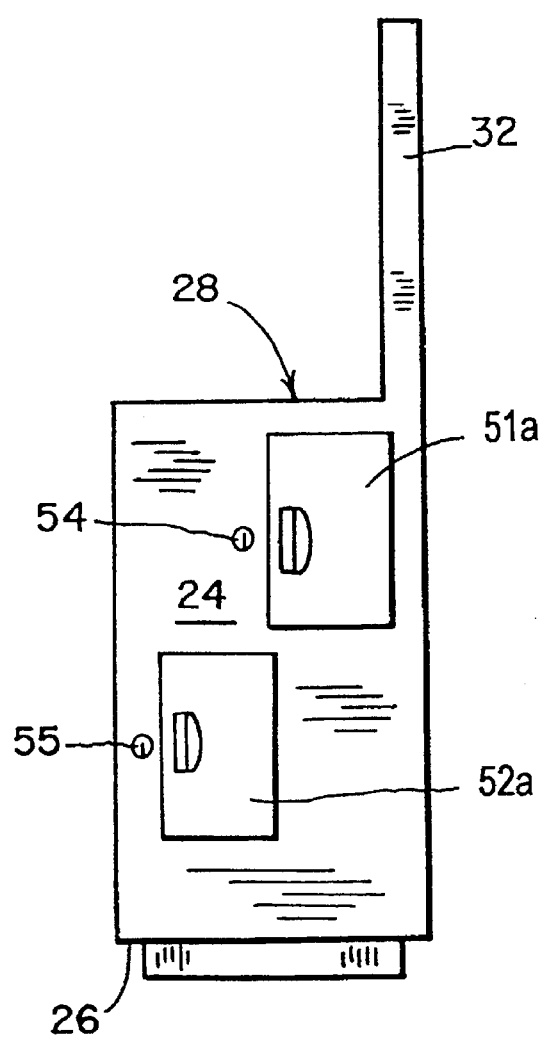
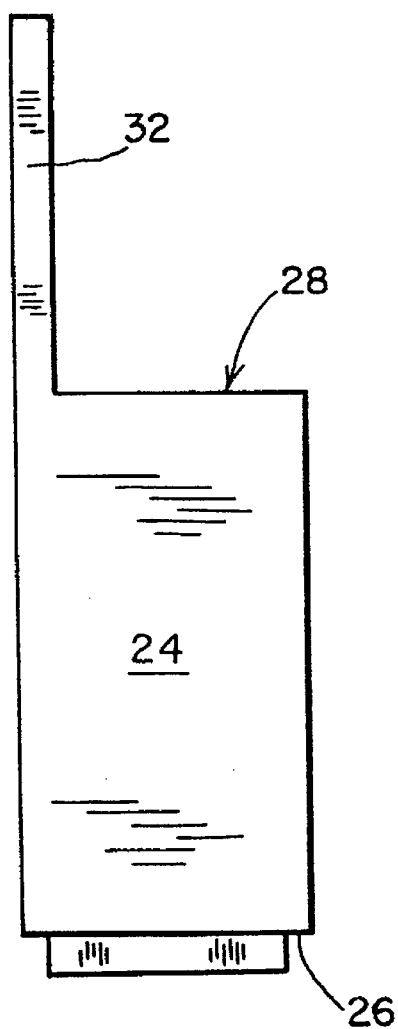
FIG. 3
FIG. 4

VISITOR IDENTIFICATION SYSTEM

The present invention relates to a visitor identification system (VIS) for maintaining a video log of visitors to a building and/or other secured areas. More particularly, the present invention relates to a VIS having a pair of video cameras, switching means for sequentially recording a first image with a first camera, a second image with a second camera, and then reverting back to record the first camera.

BACKGROUND

Video identification systems with video monitoring and/or video recording have been developed in the past. However, for one reason or another, most previously suggested systems have met with limited success either due to their high cost and complexity. For example, some prior art systems required users to keep video records for each camera or device when only one complete record is desired. In addition, several VISs incorporate video identification recording devices such as palm readers, bar scanner, and magnetic strip readers as a means for gathering and recording additional information making the need for a single combined record even more essential and desirable. For example, U.S. Pat. No. 4,821,118 to Lafreniere describes a system equipped with a video imager capable of taking a still picture of a person's face with one camera and a still picture of a person's palm and a piece of identification with another camera and recording them for retrieval purposes later. Other patents, such as U.S. Pat. No. 4,449,189 to Feix et al. and U.S. Pat. No. 4,581,634 to Williams, disclose speech recognition devices and badge scanners for recording additional personal information and storing the same for retrieval and archival purposes. Still other patents such as U.S. Pat. No. 5,283,644 to Maeno and U.S. Pat. No. 5,012,522 to Lambert incorporate elaborate comparators, video identifiers and the like for authorizing access to secured areas and/or detecting unwanted intruders.

For the most part, the prior art inventions are overly complex and record either too much information, too little information or record the information on separate recording devices or on different records and formats making retrieval overly burdensome and slow. In addition and primarily due to their many components and bulky features, most of the prior systems have to be permanently installed at a specific area making portability of the unit difficult and in some instances entirely impracticable. So far as is known, none of the prior art devices disclose a portable VIS wherein a first camera monitors and records a first image until a second camera is activated upon the happening of an event. Nor is there known a system wherein a second camera then records a person's personal indicia on the same record and then switches back to the first camera for continued monitoring and recording.

SUMMARY OF THE INVENTION

Accordingly, it is an object of the present invention to provide a novel video identification system (VIS) having a video recording device and a pair of cameras, a first camera for monitoring and recording a first image and a second camera for alternately and/or selectively recording a second image taken from a person's personal indicia.

It is another object of the present invention to provide a VIS having a switching means for alternately switching a recording device from a first camera to a second camera and then back to the first camera.

It is also an object of the present invention to provide a VIS capable of coupling a first image taken from the first camera with a second image taken from the second camera so that only a single recording device is necessary for a complete record of activity.

Additionally, it is an object of the present invention to provide a VIS which is easily adaptable for use with a computerized video imaging, recording and retrieval system.

It is another object of the present invention to provide a self-contained VIS which is compact, easily transportable and which provides the ability to replay recorded images in a portable unit.

BRIEF DESCRIPTION OF THE DRAWINGS

Other objects and features of the present invention will become apparent from the following detailed description considered in connection with the accompanied drawings which disclose several embodiments of the present invention. It should be understood, however, that the drawings are designed for the purpose of illustration only and not as a definition of the limits of the invention.

In the drawings, wherein similar reference characters denote similar elements throughout the several views:

FIG. 3 is a right side profile of the video identification system shown in FIG. 1;

FIG. 4 is a left side profile of the video identification system shown in FIG. 1;

DETAILED DESCRIPTION

In accordance with one embodiment of the present invention, a VIS comprises a first camera for recording at least a first image, a second camera for recording at least a second image, e.g. from a piece of identification, and a recording device connected to the first camera and the second camera for storing at least the first image and the second image. The system also advantageously comprises means for switching the recording device to record the first image from the first camera, to subsequently record the second image from the second camera, and then reverting to record the image of the first camera. Most desirably, the VIS additionally records audio from at least the first video camera. Additionally, the VIS is preferably equipped with automated activating means such as a motion detector, actuator or similar triggering device.

Advantageously, the VIS is equipped with a computer having an audio/video imaging and recording system for storing and sorting the acquired data. In one preferred embodiment, the VIS is furnished with means for recording at least one generated image with at least one of the images acquired from either the first camera or the second camera. Advantageously, the generated image comprises indicia such as the date, location and time the images are taken.

In another particular embodiment, the VIS further comprises an information device such as a magnetic strip reader, bar code scanner or laser scanner for reading additional information from an identification card and transmitting the additional information to the computer. Preferably, the additional information comprises indicia selected from the group consisting of the visitor's age, sex, height, weight and physical description.

Most desirably, the VIS is coupled with a software program capable of sorting and retrieving the images and any additional information according to desired criteria such as a visitor's date of entry, time of entry, entry number, age, sex, height, weight and/or physical description.

Preferably, the VIS further comprises means for sequentially recording the entry number of a visitor in conjunction with the acquired images. Advantageously, the first video camera of the VIS is positioned to accurately record a person's height, and desirably, the height is recorded in conjunction with the first image. In another embodiment, the VIS may comprise a video display monitor for selectively displaying the first image, the second image and/or the first image and the second image simultaneously.

Figure 1:
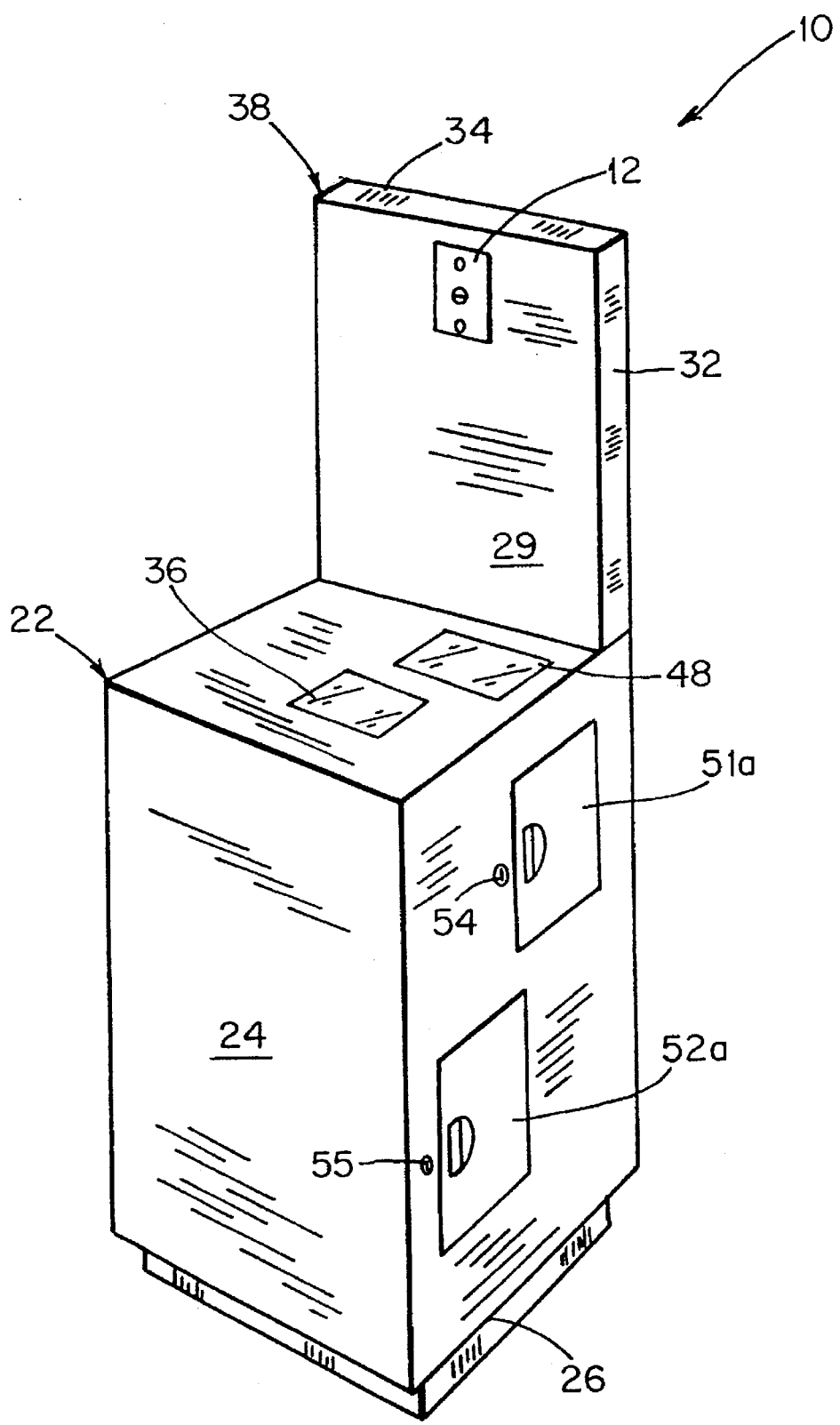
FIG. 1 is a perspective view of a video identification system of one embodiment of the present invention.
Figure 2:
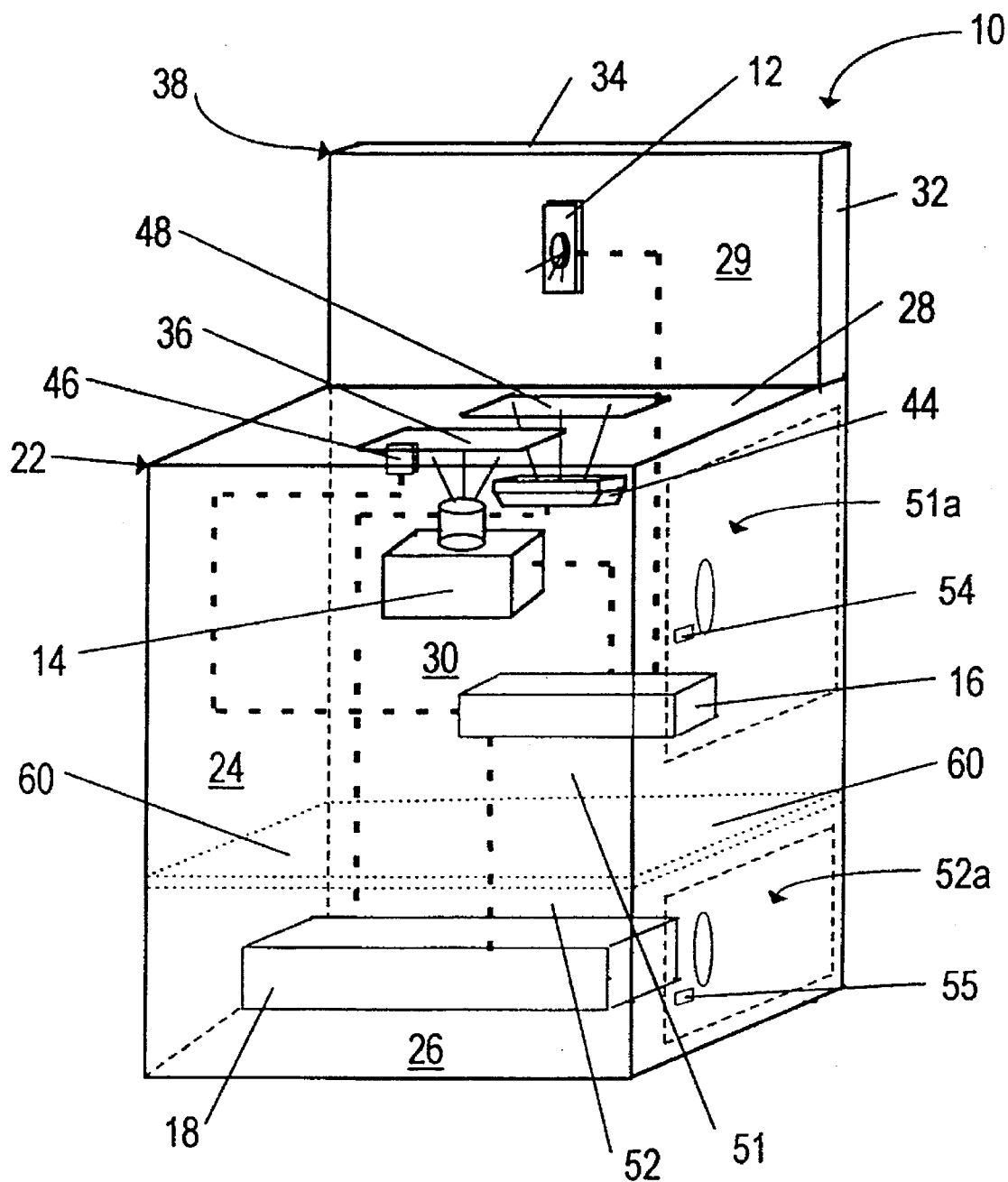
FIG. 2 is an internally illustrated perspective view of a video identification system of the present invention.

Turning now in detail to the appended drawings, and in particular FIGS. 1 and 2, therein illustrated is a novel VIS, according to one embodiment of the present invention, generally designated by reference numeral 10. VIS 10 comprises first camera 12 and second camera 14 (seen best in FIGS. 2). First camera 12 is equipped with both video and audio sensors while second camera 14 is equipped with video capability.

FIG. 2 shows a recorder/playback device 18 connected a switch 16, which, in turn, is connected to first camera 12 and second camera 14. Switch 16 preferably controls which signals are recorded, i.e. signals from first camera 12 and/or signals from second camera 14, upon the happening of an event. In a particularly preferred embodiment a detector 46 activates second camera 14 when a particular motion is detected and re-activates first camera 12 after a predetermined period of time. The detector is preferably connected to switch 16 to coordinate the recording of the proper sounds/images. The detector may be a motion detector, a pressure activated pad or another type of sensor. For example, a motion detector may be placed below an identification card window 36. In this manner, second camera 14 is only activated when an identification card is placed on window 36. Furthermore, a pressure sensitive floor mat may be placed in front of the cameras to sense the presence of a person. Such a floor mat can also be provided with suitable pneumatic controls to record a person's weight upon entering and/or leaving a secured area. Sensors may also be employed to activate first camera 12 in order to conserve energy and recording media, e.g. tape.

Although, the present invention may be configured to allow remote viewing, FIGS. 1-8 illustrate a preferred portable embodiment wherein all the aforementioned elements are housed in a single portable unit. Ideally, this particular embodiment can be used indoors or for outdoor events such as concerts or plays when connected to a battery package or other power source.

The embodiment internally illustrated in FIG. 2 also comprises a cabinet 22 having sidewalls 24, bottom plate 26 and top plate 28 defining an interior chamber 30 for the internal components. A shelf or partition 60 separates interior chamber 30 into a top chamber 51 and a bottom chamber 52. Top chamber 51 houses the second camera 14, switch 16, detector 46 and monitor 44 while bottom chamber 52 houses recorder 18. Each chamber 51, 52 has an access panel 51a and 52a respectively for external access to the aforementioned components. In addition, each access panel 51a, 52a may be provided with security means such as a lock 54 and 55, respectively, for limiting access to the interior components. Partition 60 divides top chamber 51 and bottom chamber 52 providing additional security for the more sensitive internal components.

A second cabinet 38 extends upwardly from lower cabinet 22 and is defined by side plates 32, front plate 29 and end plate 34. The second cabinet houses first camera 12 for video and audio recording of a visitor.

Window 36 is preferably disposed within top plate 28 enabling second camera 14 to clearly record a visitor's identification, e.g. driver's license, passport, security card, etc., when placed atop window 36. In a preferred embodiment, first camera 12 is positioned so that an accurate record of a person's height can be determined and recorded in conjunction with the acquired images. In this regard, a linear scale may be positioned behind the standing area of a visitor to accurately record the visitor's height.

A second window or clear pane 48 is also preferably positioned on or within top plate 28 to protect a display monitor 44. The monitor 44 advantageously displays images received by either or both cameras. Furthermore, the monitor 44 is preferably connected to recorder/playback device 18 to permit security personnel and/or victims to identify suspects or perpetrators of wrongful acts.

Figure 5:
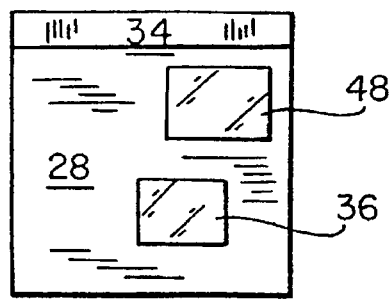
FIG. 5 is a top plan view of the video identification system shown in FIG. 1.
Figure 6:
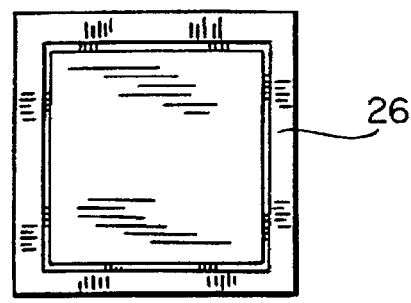
FIG. 6 is a bottom view of the video identification system shown in FIG. 1.
Figure 7:
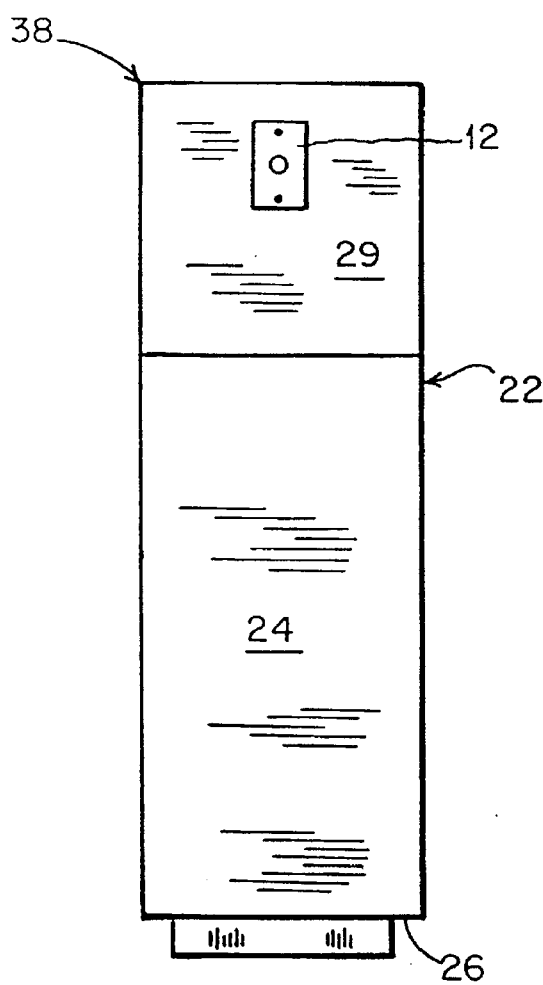
FIG. 7 is a frontal view of the video identification system shown in FIG. 1.
Figure 8:
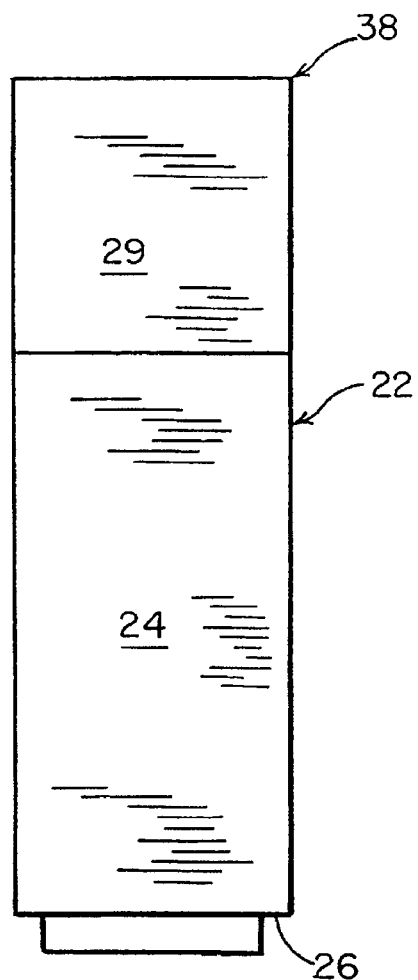
FIG. 8 is a rear view of the video identification system shown in FIG. 1.

FIGS. 3-8 illustrate various views of a preferred embodiment of the present invention. In particular, FIG. 3 shows a right side profile of the invention having access doors 51a and 52a and locks 54 and 55 for the each chamber 51 and 52, respectively. FIG. 4 shows a left side profile of the cabinet. FIG. 5 shows a top plan view illustrating window 36 and second window 48 in their preferred positions. FIGS. 6 and 8 show a bottom and rear view of this embodiment of the invention and FIG. 7 shows a front view illustrating one preferable position for first camera 12.

Figure 9:
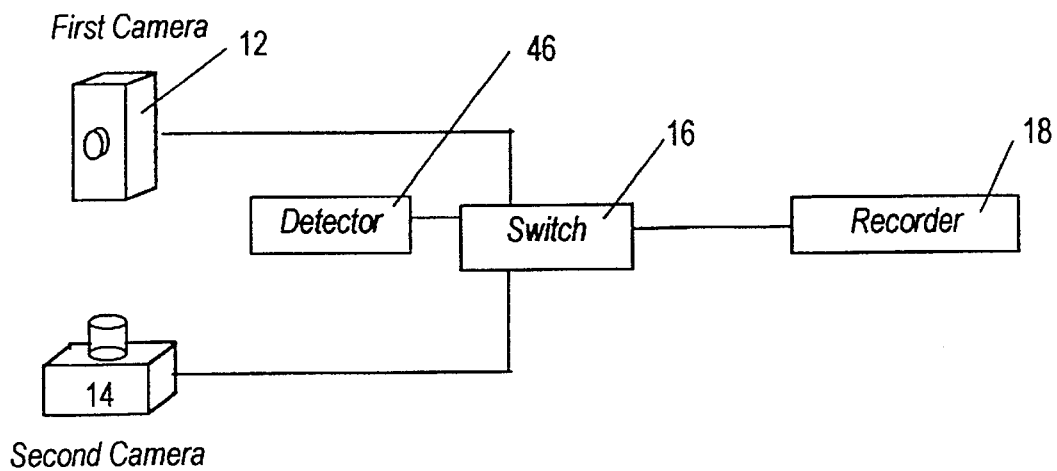
FIG. 9 is a schematic diagram of a video identification system of one embodiment of the present invention.
Figure 10:
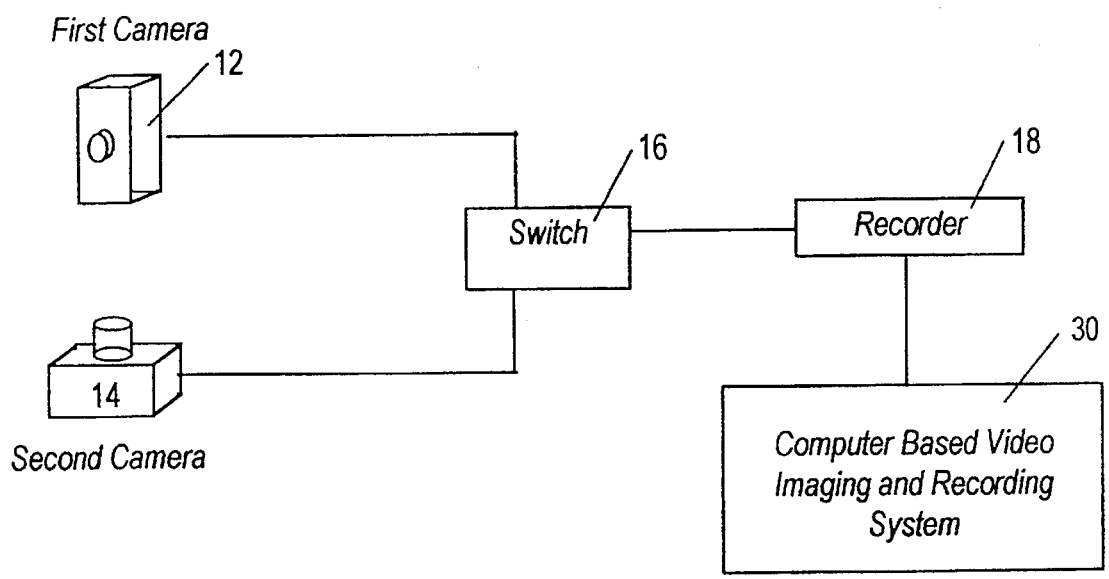
FIG. 10 is a schematic diagram showing an alternate embodiment of the present invention incorporating a computer based video imaging and recording system.
Figure 11:
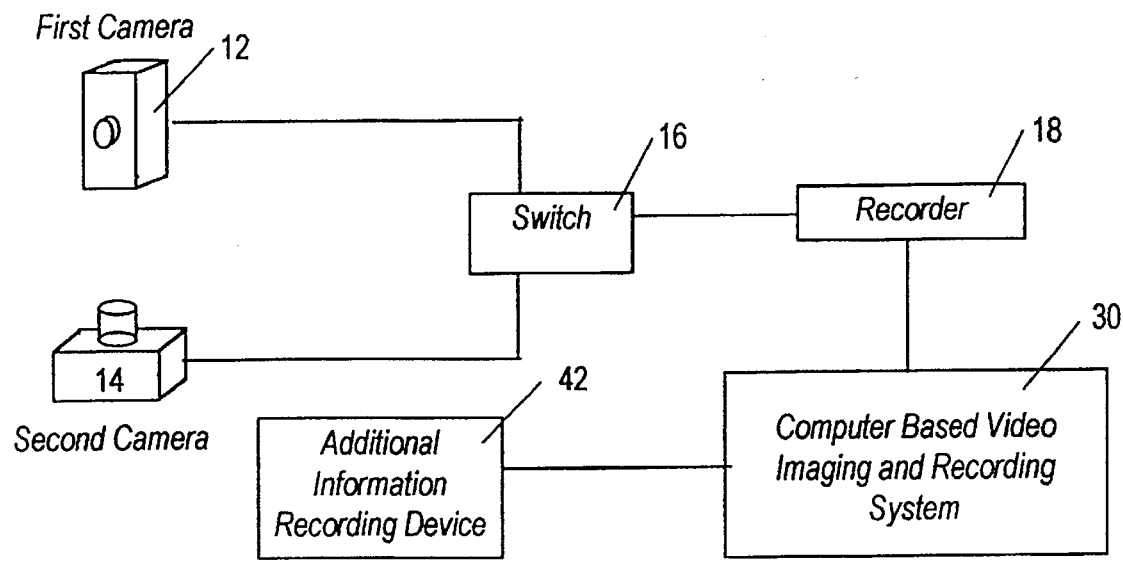
FIG. 11 is schematic diagram showing an alternate embodiment of the present invention incorporating an additional recording device.
Figure 12:
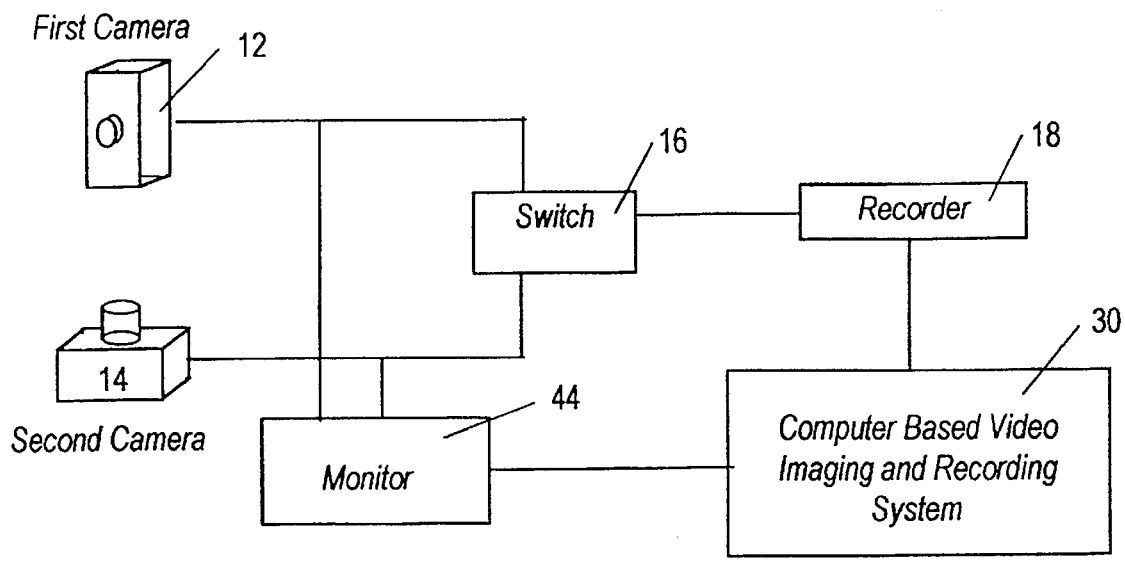
FIG. 12 is schematic diagram showing an alternate embodiment of the present invention incorporating a video monitor for use with the same.

FIG. 9 is a schematic diagram showing recorder 18 connected to switch 16, which, in turn, is connected to first camera 12 and second camera 14. In a particularly preferred embodiment a detector 46 activates second camera 14 when a particular motion is detected and re-activates first camera 12 after a predetermined period of time. FIGS. 10, 11 and 12 show alternate embodiments of the present invention with various additional devices coupled therewith. For example, FIG. 10 shows a computer-based video imaging and recording system 40 connected to the recorder 18. Although primarily used for storing the recorded images from recorder 18, computer system 30 can be loaded with a software program capable of sorting and quickly retrieving the recorded information when desired.

FIG. 11 incorporates the computer system 30 of FIG. 10 with an additional recording device 42 such as a magnetic strip reader, a laser scanner and/or a bar code reader. This allows additional information to be recorded, stored and easily retrieved along with the original information retrieved from the video images of cameras 12 and 14 and stored in computer system 30.

FIG. 12 incorporates monitor 44 for alternately and selectively viewing the image from first camera 12, second camera 14 and/or both first camera 12 and second camera 14. Ideally, monitor 44 is placed at a remote guard station for viewing the incoming visitors as they enter the monitoring area.

Various modifications may be made without departing from the scope of the present invention. For example, while the VIS is preferably shown having only cameras 12 and 14, it may be desirable to incorporate more cameras and switching means for a particular building or event. Advantageously, while the VIS 10 is preferably made from durable materials such as Formica™, wood, steel, aluminum and/or another metal, it may be made from other materials or combination thereof including, but not limited to, Plexiglas™ and fiberglass.

Advantageously it may be desirable to utilize one or more cameras with high resolution capabilities for distinguishing small printed indicia like that found on some identification cards and/or driver's licenses.

What is claimed is:

1. A self contained visitor identification system comprising:
   a first camera for receiving a first image, said first camera disposed in a first cabinet;
   a second camera for receiving a second image from a piece of identification said second camera disposed in a second cabinet comprising at least one substantially horizontal upper surface comprising a transparent window where said second camera is positioned to view an image on said transparent window;
   a recording device for recording and storing information, said recording device connected to said first camera and said second camera for recording said first image and said second image; and
   means for switching the connections to said recording device to record said first image from said first camera, to subsequently record said second image from said second camera and then to record said image of said first camera.

2. A visitor identification system according to claim 1 wherein said recording device records said second image from said second video camera for a predetermined time period.

3. A visitor identification system according to claim 1 wherein said recording device subsequently records said second image from said second video camera upon the happening of an event.

4. A visitor identification system according to claim 1 wherein said switching means is connected to a motion detector.

5. A visitor identification system according to claim 1 further comprising means for generating at least one generated image for recording with at least one of said images wherein said at least one generated image comprises indicia selected from the group consisting of the date, location, entry number of a visitor and time.

6. A visitor identification system according to claim 1 wherein said switching means comprises an actuator and a preset timing device.

7. A visitor identification system according to claim 1 wherein said switching means comprises a manual switch.

8. A visitor identification system according to claim 1 wherein said recording device records audio from said first camera.

9. A visitor identification system according to claim 1 further comprising a display monitor for selectively displaying said first image, said second image or said first image and said second image.

10. A visitor identification system according to claim 1 wherein said first camera is positioned to accurately record a visitor's height and in conjunction with said first image.

11. A visitor identification system according to claim 1 wherein said recording device is a computer.

12. A visitor identification system according to claim 11 wherein said computer is loaded with a software program capable of sorting and retrieving said information and said additional information generally according to a visitor's date of entry, time of entry, entry number, age, sex, height, weight and physical description.

13. A visitor identification system according to claim 11 further comprising a magnetic strip reader for reading additional information from an identification card and transmitting said additional information to said computer.

14. A visitor identification system according to claim 13 wherein said additional information comprises indicia selected from the group consisting of the visitor's age, sex, height, weight and physical description.

15. A visitor identification system according to claim 11 further comprising a laser scanner for reading additional information from an identification card and transmitting said additional information to said computer.

16. A visitor identification system according to claim 15 wherein said additional information is recorded in conjunction with said second image.

17. A visitor identification system according to claim 15 wherein said additional information comprises indicia selected from the group consisting of the visitor's age, sex, height, weight and physical description.

18. A self-contained video identification system comprising:
   a first camera for recording a first image, said first camera disposed in a first cabinet;
   a second camera for recording a second image from a piece of identification, said second camera disposed in a second cabinet comprising at least one substantially horizontal upper surface comprising a transparent window wherein said second camera is positioned to view images on said window;
   a playback monitor disposed on said horizontal surface;
   a recording device for recording and storing information, said recording device connected to said first camera and said second camera for alternately recording said first image and said second image; and
   means for switching said recording device to record said first image from said first camera, to subsequently record said second image from said second camera and then to record said image of said first camera.

19. A visitor identification system according to claim 18 wherein said recording device is a computer.

20. A visitor identification system according to claim 19 wherein said computer is loaded with a software program capable of sorting and retrieving said information and said additional information generally according to a visitor's date of entry, time of entry, entry number, age, sex, height, weight and physical description.

21. A visitor identification system according to claim 19 further comprising a magnetic strip reader for reading additional information from an identification card and transmitting said additional information to said computer.

22. A visitor identification system according to claim 21 wherein said additional information comprises indicia selected from the group consisting of the visitor's age, sex, height, weight and physical description.

23. A visitor identification system according to claim 19 further comprising a laser scanner for reading additional information from an identification card and transmitting said additional information to said computer.

24. A visitor identification system according to claim 23 wherein said additional information is recorded in conjunction with said second image.

25. A visitor identification system according to claim 23 wherein said additional information comprises indicia selected from the group consisting of the visitor's age, sex, height, weight and physical description.

26. A video identification system comprising:

a first camera for recording a first image and a second camera for recording a second image wherein at least one of said first camera or said second camera is disposed in at least one cabinet;

one of said at least one cabinets comprising at least one substantially horizontal upper surface comprising a transparent window wherein one of said first camera or said second camera is positioned to view images on said transparent window;

a recording device for recording and storing information, said recording device connected to said first camera and said second camera for alternately recording said first image and said second image; and means for switching said recording device to record said first image from said first camera, to subsequently record said second image from said second camera and then to record said image of said first camera.

27. A visitor identification system according to claim 26 wherein said second camera and said first camera are positioned in close proximity to one another.

28. A visitor identification system according to claim 26 wherein said second camera is disposed in one of said at least one cabinets and said first camera is positioned in close proximity to said second camera.

* * * * *